(12) United States Patent
Pellenc

(10) Patent No.: US 7,592,773 B2
(45) Date of Patent: *Sep. 22, 2009

(54) PORTABLE SELF-CONTAINED ELECTRIC POWER TOOL

(75) Inventor: Roger Pellenc, Pertuis (FR)

(73) Assignee: Pellenc (SA), Pertuis (FR)

(*) Notice: Subject to any disclaimer, the term of this patent is extended or adjusted under 35 U.S.C. 154(b) by 51 days.

This patent is subject to a terminal disclaimer.

(21) Appl. No.: 10/579,917

(22) PCT Filed: Nov. 18, 2004

(86) PCT No.: PCT/FR2004/002946

§ 371 (c)(1),
(2), (4) Date: May 19, 2006

(87) PCT Pub. No.: WO2005/053915

PCT Pub. Date: Jun. 16, 2005

(65) Prior Publication Data

US 2007/0148539 A1    Jun. 28, 2007

(30) Foreign Application Priority Data

Nov. 20, 2003 (FR) .................................. 03 13608

(51) Int. Cl.
H02J 7/00 (2006.01)
(52) U.S. Cl. ....................... 320/114; 320/112
(58) Field of Classification Search ................ 320/107, 320/108, 110, 111, 112, 113, 114
See application file for complete search history.

(56) References Cited

U.S. PATENT DOCUMENTS

| | | | |
|---|---|---|---|
| 5,929,597 A * | 7/1999 | Pfeifer et al. ................ 320/107 |
| 6,242,893 B1 | 6/2001 | Freedman | |
| 6,268,710 B1 * | 7/2001 | Koga ........................ 320/116 |
| 6,268,713 B1 | 7/2001 | Thandiwe | |
| 2001/0052758 A1 | 12/2001 | Odaohhara | |
| 2004/0075417 A1 * | 4/2004 | Aradachi et al. ............ 320/107 |
| 2004/0080298 A1 * | 4/2004 | Maggert et al. ............. 320/107 |

(Continued)

FOREIGN PATENT DOCUMENTS

EP    0 291 131    11/1988

(Continued)

*Primary Examiner*—Akm E Ullah
*Assistant Examiner*—Nguyen Tran
(74) *Attorney, Agent, or Firm*—Young & Thompson

(57) ABSTRACT

A portable self-contained electric power tool unit, includes at least three distinct sub-assemblies. The tool is characterised in that the second sub-assembly (3) may be carried by the user and includes a lithium-ion or lithium-polymer electrochemical battery (5) formed by combination of more than four cells (6) in series, each cell being made of one or several elements in parallel and a control and operating module (7) for the battery (5), guaranteeing a maximum battery capacity over time in a controlled manner and an optimal use of the tool. The first sub-assembly (2), during operation thereof, is subject to control by a current-limiting system (8), for preserving the lithium-ion or lithium-polymer battery (5) from which the above draws energy and the third sub-assembly (4) has at least one source of electrical supply, the voltage and current of which are suitable for the recharging of the lithium-ion or lithium-polymer battery (5).

27 Claims, 4 Drawing Sheets

U.S. PATENT DOCUMENTS

2005/0007068 A1 * 1/2005 Johnson et al. ............ 320/110

FOREIGN PATENT DOCUMENTS

| EP | 0 310 717 | 4/1989 |
| EP | 0 920 062 | 6/1999 |
| EP | 1 109 237 | 6/2001 |
| EP | 1 217 710 | 6/2002 |

* cited by examiner

PORTABLE SELF-CONTAINED ELECTRIC POWER TOOL

BACKGROUND OF THE INVENTION

1. Field of the Invention

The present invention relates to the field of apparatus and instruments with self-contained energy sources, more particularly portable electric tools with self-contained power, and has for its object an assembly of tool of the mentioned type with a polymer or lithium ion battery.

2. Description of the Related Art

In what follows, there will be meant by "tool" generally an apparatus or instrument adapted to facilitate the physical action of an operator in the execution of a material task or in executing said task under the control of the operator. By tool assembly, is meant a tool with its self-contained energy source and the supply means for this latter.

There can be cited as tools already made by applicant: electronic pruning shears for the size of fruit trees and grape vines, vegetable bundlers and tools for gathering fruit.

There can also be cited in a non-limitative way, as tools of the mentioned type and produced according to similar technologies: chainsaws, portable lawnmowers with wires, hedge trimmers, jackhammers.

These portable electric power tools are distinguished essentially from comparable tools actuated by sources of hydraulic, pneumatic or electric energy, by the fact that they are self-contained and independent of any external energy source, which permits the operator to be entirely free in his movements. There are also distinguished from self-contained electric portable tools actuated by heat engines, by the absence of pollution, bad odors, vibrations and noise during their operation and by their reliability in use.

It has been demonstrated on the other part that the use of these tools gives rise to comfort of without precedent, because of their silence and their flexibility.

Such portable self-contained electric power tools generally comprise at least three separate functional subassemblies, namely, a first subassembly forming an electrical actuator and generating the mechanical action of the tool, a second subassembly forming an electric energy source and comprising essentially a rechargeable electrochemical battery, and a third subassembly forming a charger adapted for the controlled recharging of the battery.

The appearance and development of these tools are principally due to two technical factors:
on the one hand, the arrival on the market of new types of batteries having better capacity/weight ratio,
on the other hand, the development of technologies of electrical motors with very high output.

The batteries at present used on tools mentioned as examples are of the nickel cadmium type or the nickel metal hydride type. They have an energy capacity of about 30 to 50 Watt hours per kilogram.

Given that an operator has, in accordance particularly with the official recommendations, a capacity of carrying on his back, in a bandolier or belt, 4 kg maximum for continuous working per day, it has been determined that with present techniques, with nickel cadmium and nickel metal hydride, the total capacity of the battery carried by the operator will be comprised between 150 and 200 Watt hours.

This capacity is not sufficient to give self-contained portable electric power tools, the energy necessary to work half a day, nor of course a full day.

There thus exists the need and effective demand for batteries having a better capacitance/weight ratio, so as to permit extending the field of application of portable self-contained electric power tools, given their advantages and qualities set forth above.

The invention seeks, to this end, to use the emerging technology of lithium ion and lithium polymer batteries in the context of portable self-contained electric power tools.

Thus, although these batteries are at present frequently used in mobile phones, camcorders and portable computers, they are not yet used in applications of portable electric tools, particularly power tools, given the difficulties encountered in their use in this application. However, they offer capacitance/weight ratios of 150 to 200 Watt hours per kilogram, which would permit tripling, or even quadrupling, the power or the lifetime of these portable electric tools, relative to their present possibilities with nickel cadmium or nickel metal hydride batteries.

It should be noted that, given the power requirement, the use of lithium ion and lithium polymer batteries in the application to portable electric power tools requires the provision of high voltages.

Thus, lithium ion and lithium polymer elements cannot by their nature deliver a high current and because of this require the coupling of basic elements in series, so as to obtain high voltages, permitting in this way the supply of substantial power despite a weak current.

Thus, for the formation of batteries delivering electrical power suitable for applications in portable self-contained power tools, whilst respecting the laws in force as to usage voltage and by providing useful working voltages, there should be provided series couplings of numerous elements or numerous cells, each of these latter containing several elements in parallel.

There result substantial difficulties for controlling and operating such batteries of multiple components, which have not to this day been solved.

Thus, the in applications previously cited (mobile phones, camcorders and portable computers) the batteries comprise in general at most four elements associated in series, whose use during charging and discharging is less complex and relatively easy to use.

BRIEF SUMMARY OF THE INVENTION

The object of the present invention is to find a solution to the problem set forth above.

To this end, the present invention relates to a portable self-contained electric power tool assembly of the mentioned type, which is to say comprising at least the three functional subassemblies previously recited, this tool assembly being characterized in that:

the second subassembly is portable by the operator and is constituted on the one hand by a lithium ion or lithium polymer electrochemical battery formed by association of more than four cells in series, each cell being comprised by one or several elements in parallel and, on the other hand, by a module for using and controlling the battery, preferably in the form of an electronic device located in immediate proximity to said battery and ensuring over the course of time and in a controlled manner, a maximum capacitance of the battery and an optimal use of the tool;

the first subassembly is submitted during its operation to use by a system of current limitation adapted to preserve the lithium ion or lithium polymer battery from which it draws energy;

the third subassembly consists in at least one source of electrical supply whose voltage and current are suitable for the recharging of the lithium ion or lithium polymer battery.

BRIEF DESCRIPTION OF THE DRAWING FIGURES

The present invention will be better understood from the following description, which relates to a preferred embodiment, given by way of non-limiting example, and explained with reference to the accompanying schematic drawings, in which.

DETAILED DECRIPTION OF THE PREFERRED EMBODIMENTS

Figure 1:
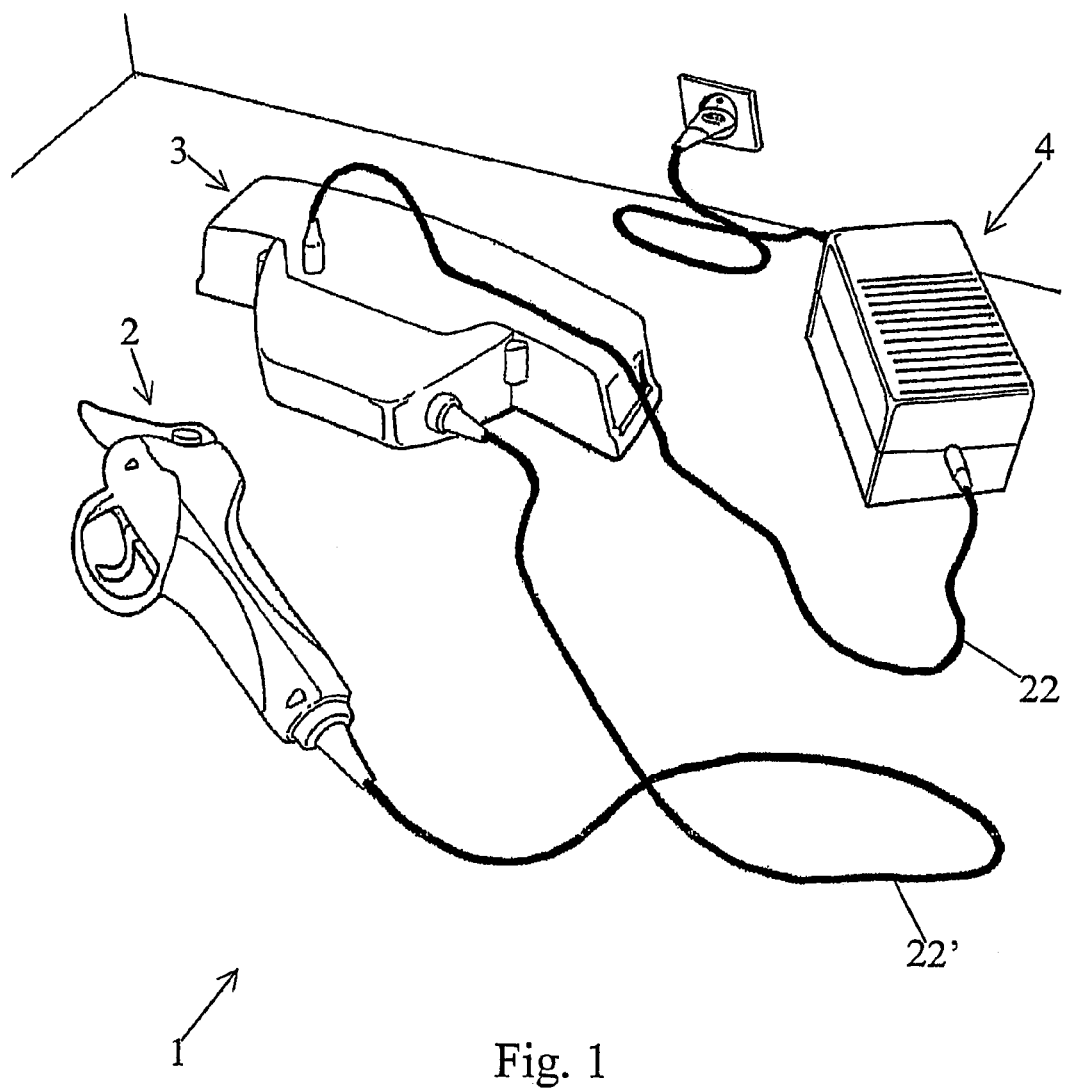
FIG. 1 is a perspective view of a tool assembly according to the invention, in the form of a pruning shears, during a charging phase.
Figure 3:
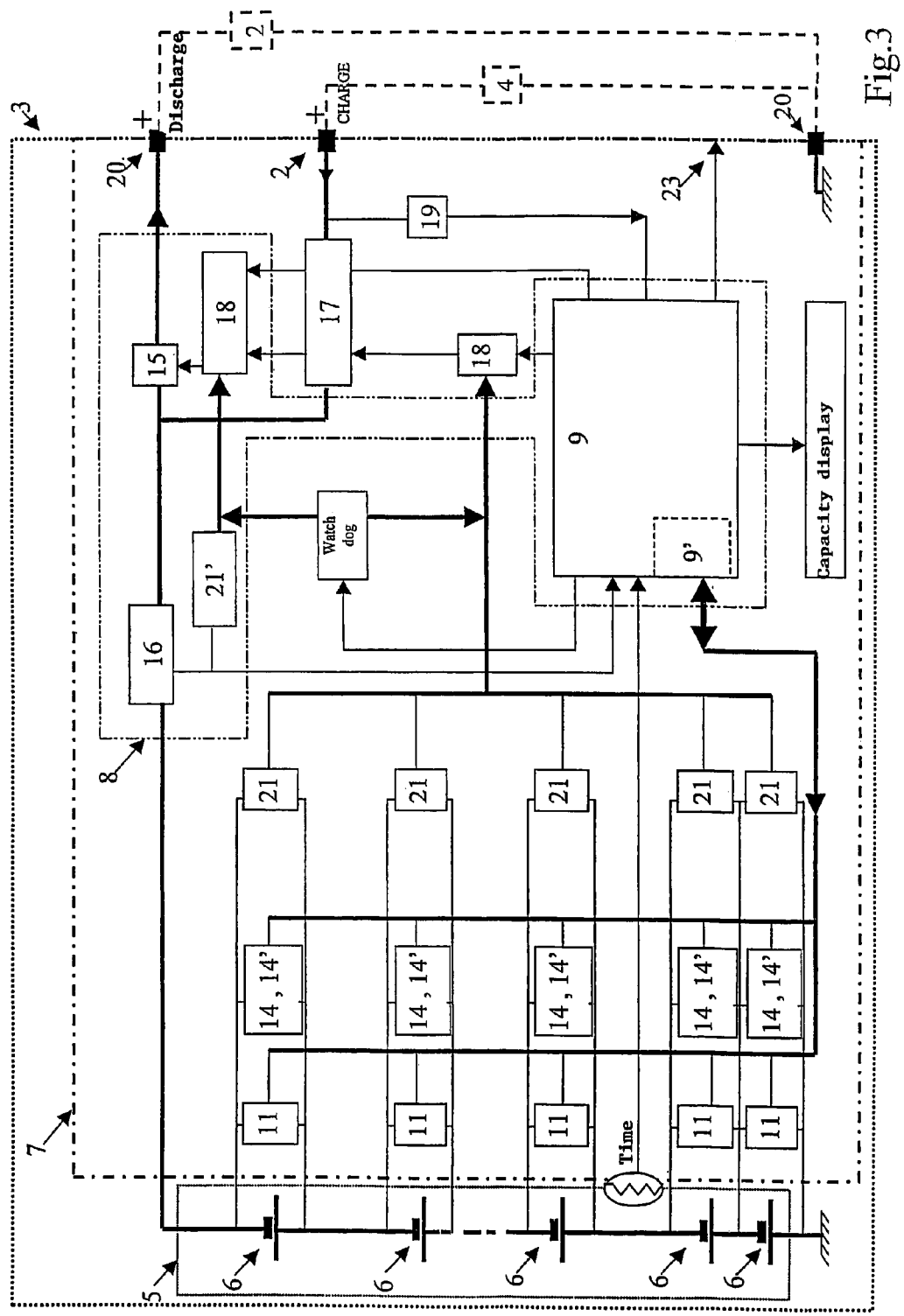
FIG. 3 is a synoptic diagram of the second functional subassembly forming a part of the tool assembly, and, FIG. 4 is a circuit diagram of certain constituent elements of the second subassembly shown in FIG. 3.
Figure 4:
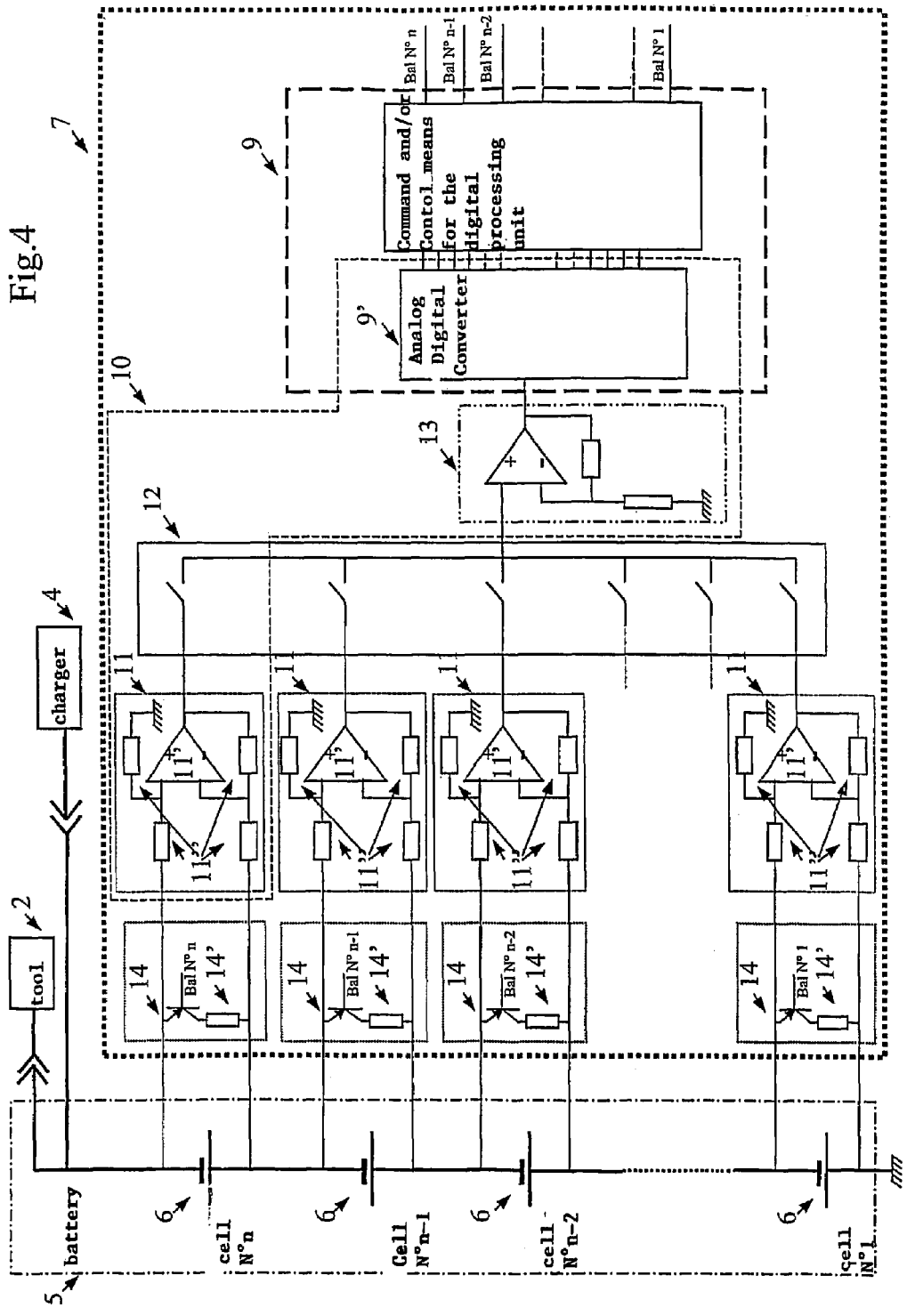

As seen in FIGS. 1, 3 and 4, the portable self-contained electric power tool 1 comprises at least three separate functional subassemblies 2, 3 and 4, namely, a first subassembly 2 forming an electrical actuator and generating the mechanical action of the tool, a second subassembly 3 forming a source of electrical energy and comprising essentially a rechargeable electrochemical battery 5, and a third subassembly 4 forming a charger adapted to carry out controlled recharging of the battery 5.

According to the invention, the second subassembly 3 is portable by the operator and is constituted on the one hand by a lithium ion or lithium polymer electrochemical battery 5 formed by association by more than four cells 6 in series, each cell being comprised by one or several elements in parallel and, on the other hand, by a control and operating module 7 of the battery 5, preferably in the form of an electronic device located immediately adjacent said battery 5 and ensuring over time and in a controlled manner a maximum capacitance of the battery and an optimum use of the tool.

Moreover, the first subassembly 2 is subject during its operation to control by a system 8 of current limitation adapted to preserve the lithium ion or lithium polymer battery 5 from which it draws energy, and the third subassembly 4 consists of at least one source of electrical supply whose voltage and current are suitable to recharging the lithium ion or lithium polymer battery 5.

By locating the module 7 immediately adjacent the battery 5, the cable connections are made easier and the measuring and control signals are less exposed to disturbances, losses and parasitic phenomena and less subject to drift, because of a reduced transmission distance.

The second and third subassemblies 3 and 4 can be in the form of a single unit integrating said two subassemblies 3 and 4 or in the form of two physically separate modules, interconnected during charging phases.

This latter modification will of course be preferred in the context of the present invention, to reduce the load to be carried by the user.

According to a preferred embodiment of the invention, the electronic control and operating module 7 of the battery 5 of the second subassembly 3 is present in the form of a electronic card and comprises at least one digital processing unit 9, such as for example a microprocessor, microcontroller, a digital signal processor, associated with a memory and with supplemental circuits, adapted together to fulfill at least certain, and preferably all the tasks of the following group of tasks comprised by:

management of the charge,
management of discharge,
balancing the charge of each cell 6,
evaluation and display of the capacity of the battery 5,
protection during discharge of the battery 5 by overload during use of the tool,
management of the tool during storage phases,
management of alarms,
management of the transmission of collected information,
management of diagnostics.

The execution of these different tasks is triggered and piloted by the digital processing unit 9 under the command and control of a program of management of the operation of the tool assembly 1, taking account of the commands of the user and the values of different parameters measured in the second subassembly 3, as well as if desired in the first and/or third subassemblies 2 and/or 4.

In accordance with a first characteristic of the invention, and for the accomplishment of tasks of management of the charge, management of discharge, balancing the charge of each cell 6, evaluation and display of the capacity of the battery 5, the control and command module 7 uses continuously the values of measurement of the voltage of each cell 6 comprising the battery 5.

To this end, and as shown in FIGS. 3 and 4 of the accompanying drawings, the invention provides that, for a battery 5 comprised by n cells 6 in series, the measurement values of the voltage of each cell 6 are provided by an electronic acquisition channel 10 constituted principally by n identical analog modules 11 mounted respectively at the terminals of the n cells 6 of the battery 5 and adapted to measure the voltage of the respectively corresponding cell 6, the values of voltages measured by each of the n modules 11 being then routed, one after the other, by means of at least one analog multiplexer 12 and after amplification by a suitable circuit 13 toward an analog/digital input converter 9' of the digital processing unit 9, forming a portion of the command and control module 7.

The converter 9' could either be integrated in the unit 9 or form a circuit separate from this latter.

By means of this electronic acquisition channel 10, the command and control module 7 carries out sequential or cyclic scrutiny of the voltages of the different cells 6, giving rise to high frequency refreshment of the voltage data for each cell 6 available in the unit 9, thereby permitting taking account of rapid reaction following the occurrence of a measurement of voltage of abnormal value.

As shown in FIG. 4 of the accompanying drawings, the analog modules 11 for measuring voltages carry out respectively for each cell 6 a subtraction between the measured voltage at its positive terminal and the voltage measured at its negative terminal, this by means of a differential electronic assembly with an operational amplifier 11' using resistances 11" or resistive input elements.

So as to obtain a suitable sensitivity of measurement with certain and precise control of each cell 6, the electronic differential mounting with operational amplifier 11' of each voltage measuring module 11 comprises resistances or input resistive elements 11" of an impedance about or greater than 1 Mohm, so as to obtain very low loss currents and for example, but not in a limiting way, less than $1/20000^{th}$ per hour of the total capacity of the battery 5, the measurement values of the voltage of each cell 6 being preferably delivered with a precision of measurement of at least 50 mV.

Preferably, the precision of measurement of the desired voltage, which is to say preferably at least 50 mV, is obtained by calibration during production of the electronic card of the control and command module of the battery 7, permitting compensating individually the analog errors of voltage measurement 11.

This calibration can for example consist in introducing by programmation in the digital processing unit 9, for each voltage measurement module 11, parameters for correcting errors as a function of the measurement of one or several very precise reference voltages, which are substituted for this calibration operation by voltages normally measured at the terminals of each cell 6.

So as to permit delivering to the unit 9 a measurement signal with the required precision, the analog/digital converter 9' will provide at least ten significant bits as output.

According to another characteristic of the invention, the task of balancing the charge of the cells 6 relative to each other is managed by the digital processing unit 9, which controls on the basis of the voltage measurement values of each cell 6, and if necessary for each one, the evolution of the charge current by means of dissipating circuits based on electronic switches 14 associated with resistive elements 14'.

The process to carry out a balanced charge of the battery 5 can for example be that described in French patent application No. 03 13570, filed Nov. 20, 2003 by the present applicant.

In accordance with another characteristic of the invention, the task of managing the discharge consists in continuously scrutinizing the voltage data of each cell 6 by means of the digital processing unit 9, in interrupting the discharge when the latter detects that one of these voltages of cell 6 has reached a minimum discharge threshold predetermined by the manufacturer of lithium ion or lithium polymer elements, and in cutting the discharge by deactivating the component 15 for switching the discharge, thereby leading to stopping the tool 2 and by activating for example, not in a limiting way, a sonic or visible alarm.

As shown in FIGS. 3 and 4 of the accompanying drawings, and according to still another characteristic of the invention, the task of managing the charge, of evaluating and displaying the capacity of the battery 5 and of protection as to overcharge during discharge, are managed continuously by the digital processing unit 9 thanks to analog electronic circuit 16 for measurement of the charge and discharge current of the batter 5.

Preferably, during the task of managing the charge, although the third subassembly forming a charger 4 is connected to the second subassembly 3 at the level of the electronic card of the command and control module 7 of the battery 5, the end of charge is obtained by opening the switching component of the charge 17 which is controlled by the digital processing unit 9 when, on the one hand, said unit 9 detects by means of the analog electronic circuit 16 for measurement of the charge and discharge current a drop in the charge current to a predetermined threshold, for example 50 mA, for the battery 5 or that, on the other hand, the temperature of the battery 5 exceeds a predetermined limit value, for example 55°, or else that the charge is prolonged during a time greater than a given fraction of the theoretical charge time, for example about 20°.

Moreover, the task of evaluation and display of the capacity of the battery 5 is managed by the digital processing unit 9, this latter calculating said capacity by taking account continuously, during the charge and during the use of the tool, on the one hand, of the information as to instantaneous charge current and discharge current of the battery 5 delivered by the analog electronic circuit for measuring current of the charge and discharge 16, and, on the other hand, the values of voltage measurement of each cell 6 and, not necessarily but for more precise computation, their mean known internal resistance.

The task of protection as to overload during discharge of the battery 5 during use of the tool, adapted to preserve the lithium ion or lithium polymer battery from premature aging or excessive heating, consists either in cutting the discharge current in the case of very great impulsive excess of the maximum discharge current admitted for the battery 5, or for exceeding the maximum limit temperature permitted for this latter, or in limiting the discharge current as a function of energy consumed by the tool during a certain running time, given that the value of the energy and running time are experimentally predetermined as a function of the tool, of its use and of the desired lifetime for the lithium ion or lithium polymer battery 5 forming a portion of the second subassembly 3.

In accordance with a preferred modified embodiment, the limitation of the discharge current is managed by the digital processing unit 9 by applying a modulation control of an impulse width (MLI), generated either directly by said unit 9, or by a specialized component, through a pilot stage 18, to the switching component of the discharge 15 embodied for example in the form of a component of the MOSFET channel N type.

So as automatically to obtain optimum storage conditions, it can be provided that, when the electrical tool assembly 1 is not charging and that it has not been used for a given period of time, for example 10 days, the digital processing unit 9 automatically performs a task of managing the interposition which consists in verifying whether the residual capacity of the battery 5 is greater or not than the storage capacity predetermined by the manufacturer of lithium ion or lithium polymer elements and, if the residual capacity is much greater than the storage capacity, in triggering by the digital processing unit 9 an automatic discharge of the batter with the help of resistive circuits 14' connected in parallel to each cell 6, until the storage capacity is achieved, and thereafter stopping all the electronic circuits whilst placing the processing unit 9 on standby in a low consumption mode and, if the capacity is less than the storage capacity, in triggering by the digital processing unit 9 a sonic and/or visual alarm.

Preferably, the digital processing unit 9 is adapted to detect the connection of the charger 4 under voltage to the battery 5 by means of a voltage measurement by the command and control module 7 with at least one of the terminals 20, preferably a positive terminal, of the second subassembly 3 adapted to be connected to said charger 4.

This function, if desired carried out by means of a particularly adapted measuring circuit 19, whilst the tool is stored in a non-use phase, by detecting the instant at which at least one cell 6 has reached the minimum voltage set by the manufacturer, thereby to trigger an automatic recharge of the battery 5.

When the command and control module 7 detects an excessive or insufficient voltage of the charger 4 at the corresponding connection terminals 20 of the second subassembly 3, the digital processing unit 9 which uses this information commands the stopping of charging and triggers a sonic and/or visual alarm.

It will be noted that the pair of terminals 20 for connection to the charger 4 and the pair of terminals 20 for connection to the tool 2 have a common negative terminal connected to the ground, but separate positive terminals, to each one of which is coupled a corresponding switching component 15 or 17.

To facilitate the long-term control of the use of tool assembly 1, as well as its maintenance and the planning of its technical oversight, the task of managing information and diagnostics and consist in storing in the memory of the digital processing unit 9 information acquired during use of the tool such as for example: the number of recharges, the counting of the hours of use of the tool, the capacity of the batter 5 over time, the mean energy consumed by the tool or the like, these data being transmitted by means of a wire connection, radio frequency or infrared connection 23 to a separate exploitation terminal, for example of the personal computer type, electronic personal assistance, GSM, which can if desired be connected to the Internet.

So as to optimize the integration of the command and control means of the assembly of tool 1, the command and control module 7 of the battery 5 forming a portion of the second subassembly 3 forming a rechargeable electrical energy source, can be associated with the electronic command and control module of the actuator 2 on the same electronic card, as the case may be with the use of the same digital processing unit 9.

The digital circuit 9 will also comprise a means 24 for the control of the performance of the program of managing the tool assembly 1 and the ordained acquisition of measurement values, represented symbolically in FIG. 3.

Command and control means for the actuator 2 are already known as such and will not be further described herein.

So as to provide supplemental security, permitting protecting the cells 6 of the battery 5 in the case of use of these cells under extreme voltage or current conditions, additional circuits for cutting the connection of the second subassembly 3 with the first or the third subassembly 2 or 4 can be provided, in parallel to the normal control system described above constructed about the digital processing unit 9.

Thus, the electronic command and control module 7 of the battery 5 can comprise for each cell 6 redundant safety circuits for stopping the charging 21, adapted to control each individually, in the case of over-voltage of a cell 6, the general stopping of charging by directly deactivating the switching component for the charge without involving the digital processing unit 9.

Similarly, the electronic command and control module 7 can comprise a redundant circuit for stopping the discharge 21', adapted to control the stopping of the discharge in the case of detection of a discharge current equal to or greater than a maximum admissible value for the battery 5 by the analog electronic measuring circuit 16, by directly deactivating the switching component 15 of discharge without disturbing the digital processing unit 9.

Preferably, the third subassembly 4 forming a charger adapted to recharge the lithium ion or lithium polymer battery 5, generates a voltage with a precision of about 0.5% and a regulated current, obtained by means of a specialized voltage and current regulation circuit. Such circuits are already known as such and do not require supplemental description.

Figure 2:
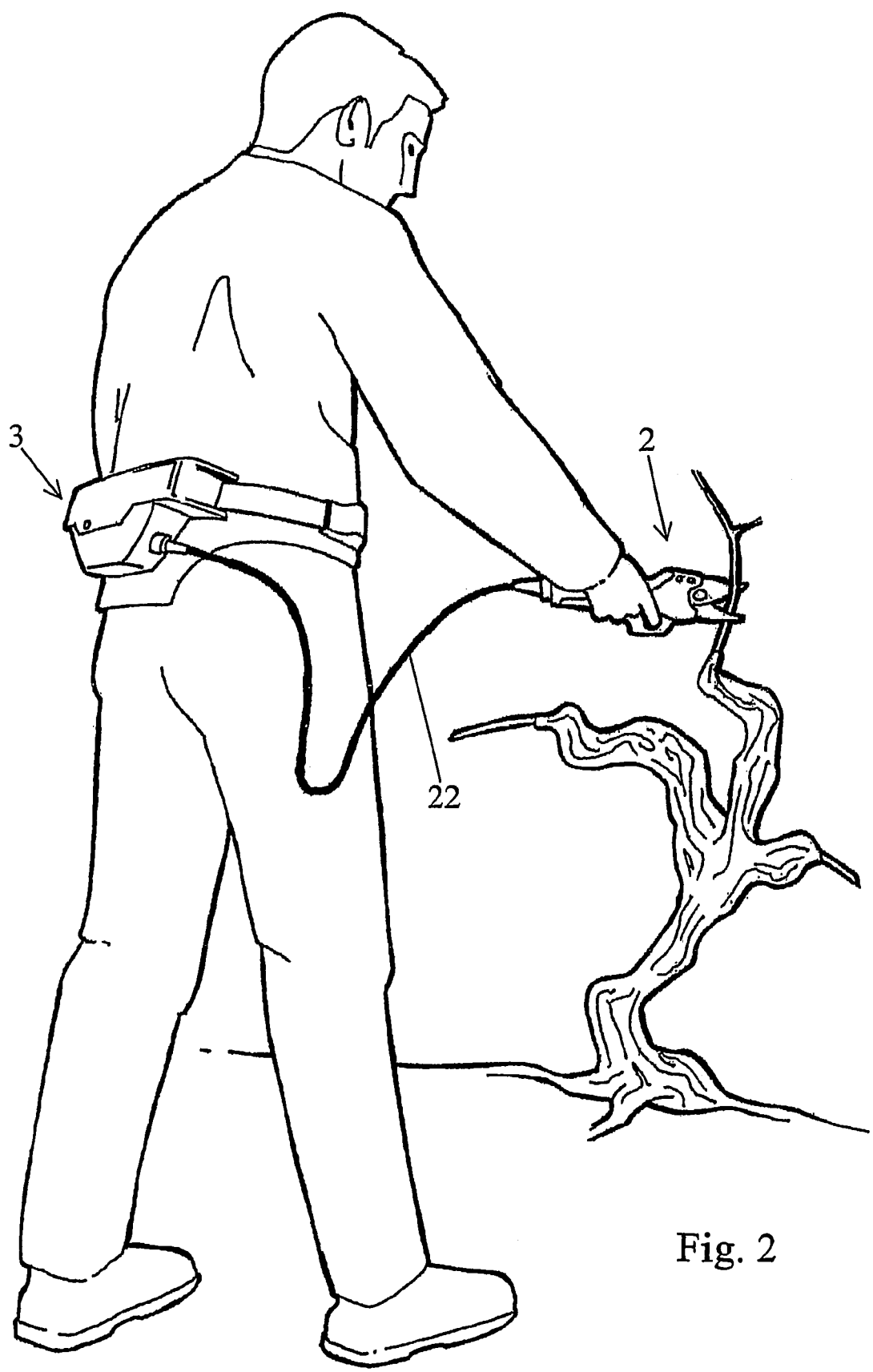
FIG. 2 is a perspective view of the tool assembly of FIG. 1 during a phase of use by the operator.

As shown in FIGS. 1 and 2 of the accompanying drawings, each functional subassembly 2, 3 and 4 is mounted (when the subassemblies 3 and 4 are separate) in a protective housing and/or for individual handling, that can be connected to each other two by two by flexible deconnectable connections 22, 22' for the transfer of energy and the transmission of command and/or control signals between said subassemblies 2, 3, 4.

It will be noted that the charging of the battery 5 can be carried out with the cable 22' connecting together the subassemblies 2 and 3 or not.

The housing enclosing the first subassembly 2 will also carry the tool and will be shaped, as to at least one portion, in an ergonomic manner to permit easy, certain and comfortable gripping on the part of the user.

Moreover, the buttons or analogous control members, as well as the display and sonic and/or luminous warning means, are preferably present in part in the casing of the first subassembly 2 and in part in the casing of the second subassembly 3, as a function of their type and the requirement to be able to be accessible by the operator during effective use of the tool assembly 1.

Of course, the invention is not limited to the embodiment described and shown in the accompanying drawings. Modifications remain possible, particularly as to the construction of the various elements or by substitution of technical equivalents, without thereby departing from the scope of protection of the invention.

The invention claimed is:

1. A portable self-contained electrical power tool assembly, comprising:
   a first subassembly forming an electrical actuator and generating the mechanical action of the tool;
   a second subassembly forming an electric energy source and comprising essentially a rechargeable electrochemical battery; and
   a third subassembly forming a charger adapted to carry out controlled recharging of the battery, wherein:
   the second subassembly (3) is portable by an operator and is constituted by a lithium ion or lithium polymer electrochemical battery (5) formed by association of more than four cells (6) in series, each cell being comprised by one or several elements in parallel and, the second subassembly (3) is also constituted by an electronic command and control module (7) for the battery (5), in the form of an electronic device located in immediate adjacency to said battery (5) and ensuring over time and in a controlled manner a maximum capacity of the battery and an optimum use of the tool;
   the first subassembly (2) is subjected during its operation to control by a system (8) of current limitation adapted to reserve the lithium ion or lithium polymer electrochemical battery (5) from which it draws energy;
   the third subassembly (4) comprises at least a source of electrical supply whose voltage and current are suitable to recharging the lithium ion or lithium polymer battery (5),
   the electronic command and control module (7) of the battery (5) fulfilling at least tasks i) to v) as follows:
   i) management of charge,
   ii) management of discharge,
   iii) balancing the charge of each cell (6),
   iv) protection in discharge of the battery (5) as to excess current during utilization of the tool,
   v) management during storage, and
   vi) management of diagnostics,
   wherein when the tool assembly is not charging and has not been used for a predetermined period the digital processing unit (9) automatically performs a task of management of storage which comprises verifying whether the residual capacity of the battery (5) is greater or not than the storage capacity predetermined by the manufacturer or lithium ion or lithium polymer elements and, if the residual capacity is substantially superior to the storage capacity, in triggering by the digital processing unit (9) an automatic discharge of the battery.

2. The electrical tool assembly according to claim 1, wherein electronic control and command module (7) of the battery (5) of the second subassembly (3) is present in the form of an electronic card and comprises at least one digital processing unit (9), comprising a microprocessor, a microcontroller, or a digital signal processor, associated with a memory and with annexed circuits, adapted together to performs in addition to tasks i) to v), at least one of the following tasks:

evaluation and display of the capacity of the battery (5), management of alarms, and management and transmission of collected information.

3. The electrical tool assembly according to claim 2, wherein for the accomplishment of the tasks of management of the charge, of management of the discharge, balancing of the charge of each cell (6), evaluation and display of the capacity of the battery (5), the command and control module (7) permanently uses the values of measurement of the voltage of each cell (6) comprising the battery (5).

4. The electrical tool assembly according to claim 3, wherein for a battery (5) formed of n cells (6) in series, the values of measurement of the voltage of each cell (6) are provided by an electronic acquisition channel (10) constituted principally of n identical analog modules (11) corresponding to the n cells (6), mounted respectively at terminals of the n cells (6) of the battery (5) and adapted to measure a voltage of the respectively corresponding cell (6), the values of voltage measured by each of the n modules (11) being then routed, one after the other, by at least one analog multiplexer (12) and after amplification by a suitable circuit (13) toward an analog/digital input converter (9') of the digital processing unit (9) forming a portion of the command and control module (7).

5. The electrical tool assembly according to claim 4, wherein the analog modules (11) for measurement of voltage perform respectively for each cell (6) a subtraction between the voltage measured at its positive terminal and the voltage measured at its negative terminal, this by a differential electronic assembly with an operational amplifier (11') using resistances (11") for resistive input elements.

6. The electrical tool assembly according to claim 5, wherein the electronic differential assembly with operational amplifier (11') of each voltage measuring module (11) comprises resistances or resistive input elements (11") of an impedance of about or greater than 1 Mohm so as to obtain very low loss currents less than $1/20000^{th}$ per hour of the total capacity of the battery (5).

7. The electrical tool assembly according to claim 3, wherein the values of measurement of the voltage of each cell (6) are delivered with a precision of measurement of at least 50 mV.

8. The electrical tool assembly according to claim 7, wherein the precision of measurement of the voltage of at least 50 mV is obtained by calibration during production of the electronic card of the command and control module of the battery (7).

9. The electrical tool assembly according to claim 8, wherein the calibration during manufacture of the electronic card comprises introducing by programming into the digital processing unit (9), for each module of voltage measurement (11), parameters for correcting errors as a function of the measurement of one or several very precise reference voltages, that are substituted for this calibrating operation for the normal voltages measured at the terminals of each cell (6).

10. The electrical tool assembly according to claim 2, wherein the task of balancing the charge of the cells (6) relative to each other is managed by the digital processing unit (9) which controls based on the values of measurement of voltage of each cell (6), a development of the charge current by dissipater circuits based on electronic switches (14) associated with resistive elements (14').

11. The electrical tool assembly according to claim 2, wherein the task of managing the discharge comprises continuously scrutinizing the voltage data of each cell (6) by the digital processing unit (9), in interrupting the discharge when the digital processing unit (9) detects that one of the voltages of the cell (6) has reached the minimum discharge threshold set by the producer of lithium ion or lithium polymer elements and in cutting the discharge by deactivating a switching component (15) of the discharge, thereby leading to stopping the tool (2) and by activating a sonic or visual alarm.

12. The electrical tool assembly according to claim 3, wherein the tasks of managing the charge, of evaluating and displaying the capacity of the battery (5) and of protection from overvoltage during discharge, are managed continuously by the digital processing unit (9) by an analog electronic circuit (16) for measurement of the current of the charge and discharge of the battery (15).

13. The electrical tool assembly according to claim 12, wherein during the task of managing the charge, while the third subassembly forming a charger (4) is connected to the second subassembly (3) at the electronic card of the command and control module (7) of the battery (5), the end of the charge is obtained by opening the switching component of the charge (17) which is controlled by the digital processing unit (9) when said unit (9) detects by means of the digital electronic circuit (16) for measuring the charge and discharge current, a drop in the charge current to a predetermined threshold, for example 50 mA, for the battery (5) or when the temperature of the battery (5) exceeds a permitted limit value, or that the charging is prolonged during a time greater than a given fraction of the theoretical charge time.

14. The electrical tool assembly according to claim 12, wherein the task of evaluation and display of the capacity of the battery (5) is managed by the digital processing unit (9) computing said capacity by taking into account continuously, during charge and during use of the tool, information as to the instantaneous current of the charge and discharge of the battery (5) delivered by the analog electronic circuit for measuring the current of charge and discharge (16) or the values of measurement of voltage of each cell (6) and, for more precise computation, their known mean internal resistance.

15. The electrical tool assembly according to claim 2, wherein the task of protection from over-current during the discharge of the battery (5) during use of the tool, adapted to preserve the lithium ion or lithium polymer battery from premature aging or from exaggerated heating, comprises either in cutting the discharge current in the case of very large impulsional exceeding of the maximum discharge current for the battery (5) or by exceeding the maximum limit temperature permitted for this latter, or by limiting the discharge current as a function of the energy consumed by the tool during a certain running time, given that the value of the energy of the running time is predetermined experimentally as a function of the tool, of it use and of the desired lifetime for the lithium ion or lithium polymer battery (5) forming a portion of the second subassembly (3).

16. The electrical tool assembly according to claim 15, wherein the limitation of discharge current is managed by the unit (9) for digital processing by applying a command for modulation of impulse width (MLI), generated either directly by said unit (9), or by a specialized component, or by a piloting stage (18), with a switching component of the discharge (15) provided in the form of a component of a MOSFET channel N type.

17. The electrical tool assembly according to claim 2, wherein with the help of resistive circuits (14, 14') connected in parallel with each cell (6), until the storage capacity is reached, and then stopping all the electronic circuits while placing the processing unit (9) is standby in low consumption mode and, if the capacity is below the storage capacity, triggering by the digital processing unit (9) a sonic and/or visual alarm.

18. The electrical tool assembly according to claim 2, wherein the digital processing unit (9) is adapted to detect the connection of the charger (4) under voltage to the battery (5) by a voltage measurement by the command and control module (7) at at least one of the terminals (20) of the second subassembly (3) adapted to be connected to said charger (4).

19. The electrical tool assembly according to claim 18, wherein the function of detection of the connection of the charger (4) under voltage to the battery (5) is carried out by a particular suitable measuring circuit (19), permitting, while the tool is stored in nonuse phase, by detecting the instant at which at least one cell (6) achieves the minimum voltage set by the manufacturer, thereby to trigger an automatic recharge of the battery (5).

20. The electrical tool assembly according to claim 18, wherein when the command and control module (7) detects an excessive or insufficient voltage of the charger (4) at the corresponding connection terminals (20) of the second subassembly (3), the digital processing unit (9) which uses this information commands the stopping of charging and triggers a sonic and/or visual alarm.

21. The electrical tool assembly according to claim 2, wherein the task of managing the information and diagnostics consists in storing in the memory of the digital process unit (9) information acquired during the use of the tool including at least one of:
a number of recharges,
a total of the hours of use of the tool,
a development of the capacity of the battery (5) with time, or
a mean energy consumed by the tool,
this information being adapted to be transmitted by means of a wire connection (23), radio frequency of infrared toward a separate exploitation terminal of the personal computer type, an electronic personal assistant, GSM, or the information can be transmitted via Internet.

22. The electrical tool assembly according to claim 2, wherein the command and control module (7) of the battery (5) forming a portion of the second subassembly (3) forming a source of rechargeable electrical energy is associated with the electronic command and control module of the actuator (2) on the same electronic card, with use of the same digital processing unit (9).

23. The electrical tool assembly according to claim 1, wherein the electronic command and control module (7) of the battery (5) comprises for each cell (6) redundant security circuits for stopping charging (21), adapted to control each individually, in case of overvoltage of a cell (6), the general stopping of the charge by deactivating directly a switching component (17) for the charge without disturbing the digital processing unit (9).

24. The electrical tool assembly according to claim 12, wherein the electronic command and control module (7) comprises a redundant circuit for stopping discharge (21'), adapted to control the stopping of discharge in the case of detection of a discharge current equal to or greater than a maximum admissible value for the battery (5) by the analog electronic measuring circuit (16), by directly deactivating the switching component (15) of the discharge without disturbing the digital processing unit (9).

25. The electrical tool assembly according to claim 1, wherein the third subassembly (4) forming a charger adapted to recharge the lithium ion or lithium polymer battery (5) generates a voltage with a precision of about 0.5% and a regulated current, obtained by a specialized circuit for regulation of voltage and current.

26. The electrical tool assembly according to claim 1, wherein each functional subassembly (2, 3 and 4) is mounted in a protective housing and/or a grippable housing, which can be connected together two by two by flexible deconnectable cables (22, 22') for the transfer of energy and the transmission of command and/or control signals between said subassemblies (2, 3, 4).

27. The electrical tool assembly according to claim 1, wherein the electrical tool assembly is pruning shears, a chainsaw, a fruit collecting tool, a lawnmower with wires, or a jackhammer.

* * * * *